(12) United States Patent
Jung

(10) Patent No.: US 9,653,950 B2
(45) Date of Patent: May 16, 2017

(54) WIRELESS POWER TRANSMITTING DEVICE AND METHOD FOR CONTROLLING TO TRANSMIT WIRELESS POWER SIGNAL IN WIRELESS POWER TRANSMITTING DEVICE

(71) Applicant: HANRIM POSTECH CO., LTD., Suwon-si, Gyeonggi-do (KR)

(72) Inventor: Chun-Kil Jung, Seoul (KR)

(73) Assignee: HANRIM POSTECH CO., LTD., Suwon-si, Gyeonggi-do (KR)

(*) Notice: Subject to any disclaimer, the term of this patent is extended or adjusted under 35 U.S.C. 154(b) by 403 days.

(21) Appl. No.: 14/367,893

(22) PCT Filed: Dec. 21, 2012

(86) PCT No.: PCT/KR2012/011324
§ 371 (c)(1),
(2) Date: Jun. 20, 2014

(87) PCT Pub. No.: WO2013/095068
PCT Pub. Date: Jun. 27, 2013

(65) Prior Publication Data
US 2014/0354069 A1    Dec. 4, 2014

Related U.S. Application Data

(60) Provisional application No. 61/579,225, filed on Dec. 22, 2011.

(51) Int. Cl.
*H01F 37/00* (2006.01)
*H02J 50/80* (2016.01)
(Continued)

(52) U.S. Cl.
CPC ............. *H02J 50/80* (2016.02); *H02J 5/005* (2013.01); *H02J 7/025* (2013.01); *H04B 5/0037* (2013.01);
(Continued)

(58) Field of Classification Search
CPC .. H02J 50/80; H02J 5/005; H02J 7/025; H02J 2007/0096; H04B 5/0037; H04B 5/0075
See application file for complete search history.

(56) References Cited

U.S. PATENT DOCUMENTS

| | | | |
|---|---|---|---|
| 5,570,102 A | 10/1996 | Kochiyama et al. | ......... 343/880 |
| 7,522,878 B2 * | 4/2009 | Baarman | ................... A61L 2/10 |
| | | | 235/492 |

(Continued)

FOREIGN PATENT DOCUMENTS

| | | |
|---|---|---|
| JP | 6-253476 A | 9/1994 |
| JP | 2003-198451 A | 7/2003 |

(Continued)

OTHER PUBLICATIONS

European Office Action with extended search report, dated Aug. 14, 2015 in corresponding application No. 12859637.6.
(Continued)

*Primary Examiner* — Daniel Cavallari
(74) *Attorney, Agent, or Firm* — Envision USA Inc.

(57) ABSTRACT

There is provided a wireless power transmitting device including a transmission coil configured to transmit a wireless power signal to a wireless power receiving device; a driving driver configured to generate a wireless power driving signal which is a driving signal for the wireless power signal; an alternating current sensor configured to detect an alternating current signal of the transmission coil which is generated by a wireless power receiving signal including wireless power receiving information of a wireless
(Continued)

power receiving device; an alternating voltage sensor configured to detect an alternating voltage signal of the transmission coil, the alternating current signal being generated by the wireless power receiving signal from the wireless power receiving device; a signal processing unit configured to process the alternating current signal and the alternating voltage signal from the alternating current sensor and the alternating voltage sensor; and a wireless power transmitting controller that, when the alternating current signal and the alternating voltage signal of the transmission coil are detected and signal processing is normally performed on at least one of the alternating current signal and the alternating voltage signal, obtains the wireless power receiving information through the signal on which the signal processing is performed and controls the driving driver on the basis of the wireless power receiving information. Further, there is provided a method for controlling to transmit a wireless power signal in the wireless power transmitting device.

5 Claims, 3 Drawing Sheets

(51) Int. Cl.
    *H02J 7/02*     (2016.01)
    *H04B 5/00*     (2006.01)
    *H02J 5/00*     (2016.01)
    *H02J 7/00*     (2006.01)

(52) U.S. Cl.
    CPC .... *H04B 5/0075* (2013.01); *H02J 2007/0096* (2013.01)

(56) References Cited

U.S. PATENT DOCUMENTS

| | | | |
|---|---|---|---|
| 2003/0120745 A1 | 6/2003 | Katagishi et al. | 709/217 |
| 2005/0068019 A1 | 3/2005 | Nakamura et al. | 323/355 |
| 2009/0206791 A1 | 8/2009 | Jung | 320/108 |
| 2011/0140538 A1 | 6/2011 | Jung et al. | 307/104 |
| 2011/0260549 A1 | 10/2011 | Jung et al. | 307/104 |

FOREIGN PATENT DOCUMENTS

| | | |
|---|---|---|
| JP | 2005-110409 A | 4/2005 |
| JP | 2009-201344 A | 9/2009 |
| JP | 2010-252446 A | 11/2010 |
| JP | 2011-507481 A | 3/2011 |
| JP | 2012-511891 A | 5/2012 |
| KR | 10-2006-0107147 A | 10/2006 |
| KR | 10-2010-0094596 A | 8/2010 |
| KR | 10-2010-0112021 A | 10/2010 |
| KR | 10-0992480 B1 | 11/2010 |
| WO | WO 2009/081115 A1 | 7/2009 |

OTHER PUBLICATIONS

International Search Report mailed Apr. 24, 2013, issued to corresponding International Application No. PCT/KR2012/011324.

International Search report dated Apr. 24, 2013, issued in corresponding International Application No. PCT/KR2012/011324.

* cited by examiner

WIRELESS POWER TRANSMITTING DEVICE AND METHOD FOR CONTROLLING TO TRANSMIT WIRELESS POWER SIGNAL IN WIRELESS POWER TRANSMITTING DEVICE

CROSS-REFERENCE TO RELATED APPLICATIONS

This application is a national stage of International Application No. PCT/KR2012/011324, filed Dec. 21, 2012, which claims priority to U.S. Provisional Application No. 61/579,225, filed Dec. 22, 2011. All disclosures of the documents named above are incorporated herein by reference.

BACKGROUND OF THE INVENTION

Field of the Invention

The present invention relates to a wireless power transmitting device that increases wireless power transmitting efficiency by more reliably detecting a signal from a wireless power receiving device, and a method for controlling transmission of a wireless power signal in the wireless power transmitting device.

Description of the Related Art

In general, a battery pack is configured to receive a power (electric energy) from an external charger to supply a power for operating a mobile terminal (a cellular phone or PDA) in a charged state, and includes a battery cell that is charged with the electric energy, and a circuit that charges and discharges the battery cell (supplying the electric energy to the mobile terminal).

As a method for electrically connecting the battery pack to the charger for charging the electric energy to the battery pack used in the mobile terminal, there is a terminal supplying method in which a normal power is received to be converted into a voltage and a current corresponding to the battery pack and the electric energy is supplied to the battery pack through a terminal of the battery pack.

However, if the power is supplied in the terminal supplying method, when the charger and the battery pack are combined with each other or are separated from each other, since terminals of both sides (a terminal of the battery pack and a terminal of the charger) have different potentials from each other, there is a problem that instantaneous discharging is caused.

Additionally, there is a concern that when foreign substances are present in the terminals of the both sides due to the instantaneous discharging, fire may occur.

Further, the electric energy charged in the battery pack is naturally discharged to the outside through the terminal of the battery pack due to moisture, so that a lifespan of the battery pack and performance thereof may be degraded.

In recent years, in order to solve these problems, non-contacting charging systems and control methods using a wireless power transmitting method have been suggested.

In such a wireless power transmitting system, in order to appropriately receive the wireless power, a wireless power receiving device needs to be accurately positioned at a charging position. When the position of the wireless power receiving device is deviated from the charging position, since communication for the wireless power is not easily performed, there is a concern that the charging may be stopped.

SUMMARY OF THE INVENTION

Technical Problem

An object of the present invention is to provide a wireless power transmitting device for increasing reliability in transmitting and receiving data, and a method for controlling transmission of a wireless power signal in the wireless power transmitting device.

Technical Solution

In order to achieve the above object, an exemplary embodiment of the present invention provides a wireless power transmitting device including a transmission coil configured to transmit a wireless power signal to a wireless power receiving device; a driving driver configured to generate a wireless power driving signal which is a driving signal for the wireless power signal; an alternating current sensor configured to detect an alternating current signal of the transmission coil, the alternating current signal being generated by a wireless power receiving signal including wireless power receiving information from a wireless power receiving device; an alternating voltage sensor configured to detect an alternating voltage signal of the transmission coil, the alternating voltage signal being generated by the wireless power receiving signal of the wireless power receiving device; a signal processing unit configured to process the alternating current signal and the alternating voltage signal from the alternating current sensor and the alternating voltage sensor; and a wireless power transmitting controller configured to obtain the wireless power receiving information through a signal on which signal processing is performed when the alternating current signal and the alternating voltage signal of the transmission coil are detected and the signal processing is normally performed on at least one of the alternating current signal and the alternating voltage signal, and configured to control the driving driver on the basis of the wireless power receiving information.

In accordance with one aspect of an embodiment of the present invention, the device may further include an alternating current sensor configured to be connected to the driving driver so as to detect a direct current signal of the driving driver changed by the wireless power receiving signal.

In accordance with one aspect of an embodiment of the present invention, the wireless power transmitting controller may be configured to obtain the wireless power receiving information through the signal on which the signal processing is perform when the signal processing is normally performed on at least one of the alternating current signal, the direct current signal and the alternating voltage signal, and to control the driving driver on the basis of the wireless power receiving information.

In accordance with one aspect of an embodiment of the present invention, the wireless power transmitting controller may be configured to determine that the wireless power receiving signal is in a reception state error when the signal processing is not normally performed on all of the alternating signal, the alternating current signal and the alternating voltage signal.

In accordance with one aspect of an embodiment of the present invention, the wireless power transmitting controller may be configured to control the driving driver to stop generation of the wireless power transmitting signal when the reception state error is detected more than a predetermined number of times.

In accordance with one aspect of an embodiment of the present invention, the device may further include an indicator configured to display the reception state error.

In accordance with one aspect of an embodiment of the present invention, the wireless power transmitting controller may be configured to sequentially operate the alternating current sensor, the alternating voltage sensor and the direct current sensor to obtain the wireless power receiving signal.

In accordance with one aspect of an embodiment of the present invention, the wireless power transmitting controller may be configured to select an optimal signal of an excellent signal state among the alternating current signal, the alternating voltage signal and the direct voltage signal, and to obtain the wireless power receiving signal through the optimal signal.

In accordance with one aspect of an embodiment of the present invention, the wireless power transmitting controller may select a signal having the highest power level among the alternating current signal, the alternating voltage signal and the direct voltage signal, as the optimal signal.

In accordance with one aspect of an embodiment of the present invention, the wireless power receiving signal may include an ID signal, a voltage-up signal, a voltage-down signal, and a full charging signal.

Another exemplary embodiment of the present invention provides a method for controlling transmission of a wireless power signal in a wireless power transmitting device. The method includes receiving a wireless power receiving signal from a wireless power receiving device through a transmission coil; receiving the wireless power receiving signal by receiving at least two of an alternating current signal and an alternating voltage signal of the transmission coil which is generated by the wireless power receiving signal and a direct current signal of a driving driver; performing signal processing on normal signals to obtain wireless power receiving information included in the wireless power receiving signal when one or more of the received signals are the normal signals; and controlling a wireless power signal on the basis of the wireless power receiving information.

In accordance with one aspect of an embodiment of the present invention, the method may further include determining that the wireless power receiving signal is a reception state error when the signal processing is not normally performed on all of the alternating signal, the direct current signal and the alternating voltage signal.

In accordance with one aspect of an embodiment of the present invention, the operation of receiving the wireless power receiving signal by receiving at least two of an alternating current signal and an alternating voltage signal of the transmission coil which is generated by the wireless power receiving signal and a direct current signal of a driving driver may include obtaining the wireless power receiving signal by sequentially operating an alternating current sensor and the alternating voltage sensor connected to the transmission coil and the direct current sensor connected to the driving driver.

In accordance with one aspect of an embodiment of the present invention, the operation of performing signal processing on normal signals to obtain wireless power receiving information when one or more of the received signals are the normal signals included in the wireless power receiving signal may include selecting a signal having the highest power level among the alternating current signal, the alternating voltage signal, and the direct voltage signal as the optimal signal, to perform the signal processing on the optimal signal.

In accordance with one aspect of an embodiment of the present invention, the wireless power receiving signal may include an ID signal, a voltage-up signal, a voltage-down signal, and a full charging signal.

Advantageous Effects

According to the embodiment of the present invention having the aforementioned configuration, since wireless power receiving information is obtained by receiving a wireless power receiving signal obtained through at least two sensors and by processing the received signal, it is possible to increase reliability of power control in wireless power transmission.

Further, since a reception error is generated only when all signals obtained from at least two sensors are in an error state, a reception error rate of the wireless power receiving signal is reduced, so that it is possible to guarantee continuity of the power control.

DETAILED DESCRIPTION OF THE EMBODIMENTS

Hereinafter, a wireless power transmitting device and a method for controlling transmission of a wireless power signal in the wireless power transmitting device will be described in more detail with reference to the drawings.

Figure 1:
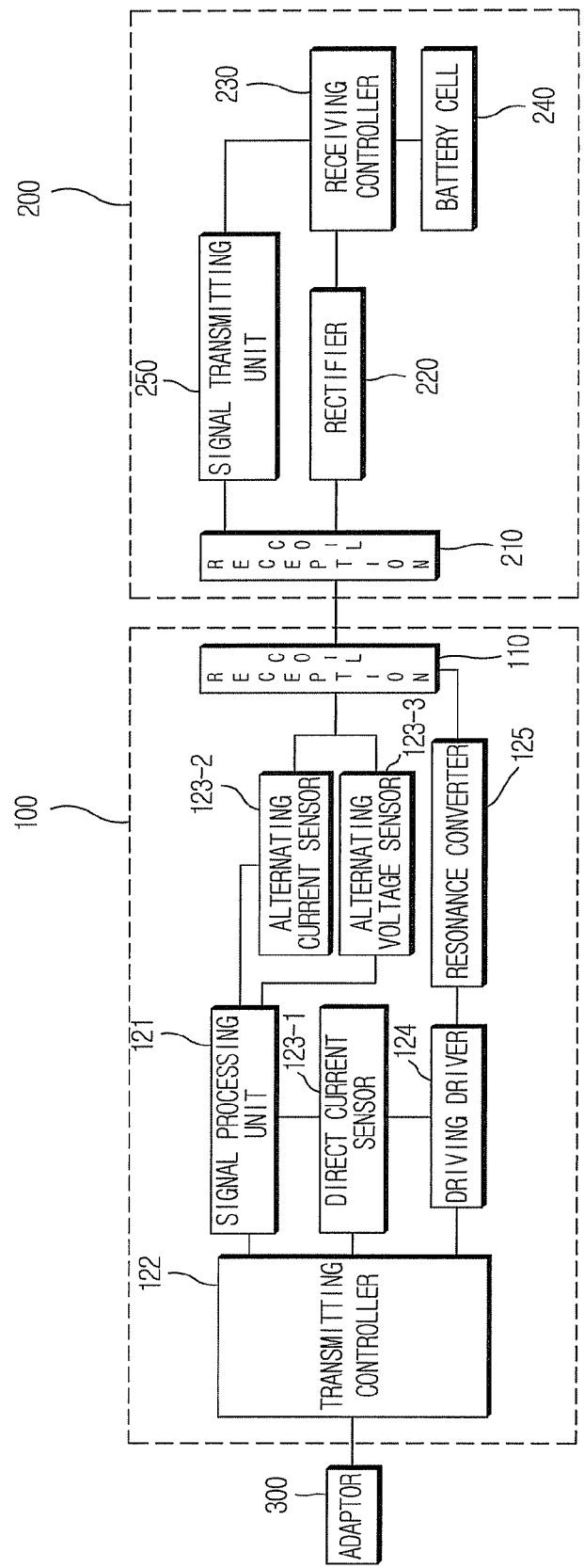
FIG. 1 is a block configuration diagram of a wireless power transmitting system according to an embodiment of the present invention.

FIG. 1 is a block diagram of a wireless power transmitting system according to an embodiment of the present invention. As shown in the drawing, the wireless power transmitting system according to the embodiment of the present invention includes a wireless power transmitting device 100, a wireless power receiving device 200, and an adaptor 300. An external alternating current power of 110 V or 220 V is converted into a direct current power by the adaptor to be supplied to the wireless power transmitting device 100. Thereafter, when the wireless power transmitting device 100 transmits a wireless power signal to the wireless power receiving device 200 in an electromagnetic induction manner, the wireless power receiving device 200 that has received the power signal charges a battery with a power of the wireless power signal, or supplies the power to an electronic device connected to the wireless power receiving device 200.

Hereinafter, configurations of the wireless power transmitting device 100 and the wireless power receiving device 200 will be described.

The wireless power transmitting device 100 according to the embodiment of the present invention includes a transmission coil 110, a signal processing unit 121, a wireless power transmitting controller 122, various detection sensors 123-1, 123-2 and 123-3, a driving driver 124, and a resonance converter 125.

Here, the transmission coil 110 is a device that transmits the power signal to a secondary coil (a reception coil) 210 of the power receiving device 200 in the electromagnetic induction manner, and in order to guarantee mobility of the wireless power receiving device 200, two coils may be applied to the transmission coil. In this case, a switching controller for selecting any one of the two coils may be further included.

The signal processing unit 121 functions to process signals from the various sensors that detect a current and a voltage of the coil, and a current of the driving driver 124 that is changed by a wireless power receiving signal (an ID signal or a charging status signal) transmitted from the wireless power receiving device 200 in a PWM (Pulse Width Modulation) manner. That is, when the ID signal that is a response to an ID request signal or the charging status signal transmitted through the transmission coil 110 is received, the signal processing unit filters the received signal, and processes the filtered signal to start charging or change the power signal during the charging (frequency change or voltage change).

Meanwhile, according to one aspect of the embodiment of the present invention, three current and voltage detection sensors are provided. That is, a direct current sensor 123-1 for measuring a direct current of the driving driver 124 and an alternating current sensor 123-2 and an alternating voltage sensor 123-3 for measuring an alternating current and an alternating voltage of the transmission coil 110 may be provided. That is, when the wireless power receiving signal (that is, including the ID signal and the charging status signal) is received from the wireless power receiving device 200 through the transmission coil 110, the current and voltage of the coil and the current of the driving driver are changed, and the changes are detected to receive the wireless power receiving signal. In the present invention, it is possible to more accurately receive the wireless power receiving signal by using the three sensors. A detailed description thereof will be described in more detail further below with reference to FIG. 3.

The wireless power transmitting controller 122 serves to receive the signal processed by the signal processing unit 121 to check the received signal, and analyze the ID signal received by the transmission coil 110 to transmit the power signal for transmitting the wireless power signal through the transmission coil 110 to the driving driver 124. Further, when the charging status signal is received from the transmission coil 110, the wireless power transmitting controller controls the driving driver 124 to change the wireless power signal on the basis of the received charging status signal.

The driving driver 124 controls an operation of the resonance converter 125 under the control of the transmitting controller 122.

The resonance converter 125 generates a transmission power for generating the desired power signal to transmit, under the control of the driving driver 124, to supply the generated transmission power to the transmission coil 110. In other words, when the transmitting controller 122 transmits a power control signal for transmitting the power signal having a required power value to the driving driver 124, the driving driver 124 controls the operation of the resonance converter 125 in accordance with the transmitted power control signal, and the resonance converter 125 applies the transmission power corresponding to a required power value to the transmission coil 110 under the control of the driving driver 124. Thus, the wireless power signal having the desired magnitude is allowed to be transmitted.

Furthermore, the resonance converter 125 functions to generate the ID request signal through the transmission coil 110 under the control of the driving driver 124.

Meanwhile, according to one aspect of the embodiment of the present invention, the wireless power transmitting device 100 may further include an indicator (not shown in the drawing). The indicator is configured to check whether wireless power transmission is easily performed, and may be a light emitting device such as a LED. When two transmission coils 110 are used and two wireless power receiving devices 200 can be simultaneously charged, two indicators are provided to represent that the wireless power transmitting signals are normally transmitted through the transmission coils 110.

Meanwhile, the wireless power transmitting device 100 may further include a temperature circuit: that is, a temperature measuring unit (not shown in the drawing). The temperature measuring unit is configured to prevent the wireless power transmitting device from being overheated. The temperature measuring unit measures the temperature of the wireless power transmitting device 100, and stops the wireless power signal transmission when the overheating occurs.

The detailed operation of the transmitting controller 122 will be described in more detail further below with reference to FIG. 2.

Meanwhile, the wireless power receiving device 200 which receives the wireless power signal from the wireless power transmitting device 100 to charge the battery, or to supply the power to an external device, includes a reception coil 210 that generates an induced power by the transmitted power signal, a rectifier 220 that rectifies the induced power, a battery cell module 240 that is charged with the rectified power, a signal transmitting unit 250 that transmits the ID signal and the charging status signal to the wireless power transmitting device 100, and a receiving controller 230 that controls the reception coil 210, the rectifier 220, the battery cell module 240 and the signal transmitting unit 250. The wireless power receiving device 200 of the present invention may be a battery pack including the battery cell module, or may be a mobile communication terminal including the battery pack.

The reception coil 210 is a component for receiving the wireless power signal transmitted from the transmission coil 110 of the wireless power transmitting device 100.

The rectifier 220 rectifies the alternating current voltage which is generated by the wireless power signal received by the reception coil 210 to the direct current voltage, and maintains a charging status with the charging voltage until the charging is started.

The battery cell module 240 is a charging target that is charged with the direct current power from the rectifier 220 under the control of the receiving controller 230. An electronic device such as a PMP (portable media player), MP3 player, or cellular phone may be used instead of the battery cell module 240. Meanwhile, the battery cell module 240 includes a protection circuit such as an overvoltage and overcurrent protecting circuit, or a temperature detecting circuit, and further includes a charging management module that collects and processes information such as a charging status of the battery cell.

The receiving controller 230 is a component that controls a current of the power charged in the rectifier 220 to allow an appropriate current to flow to the battery cell module 240, and controls the signal transmitting unit 250 to transmit the ID signal and the charging status signal in response to the ID request signal from the wireless power transmitting device 100 to the wireless power transmitting device 100 through the reception coil 210 in the PWM manner.

The signal transmitting unit 250 functions to transmit the wireless power receiving signal including the ID signal or the charging status signal (including a voltage-up signal, a voltage-down signal and a full charging signal) to the wireless power transmitting device 100 through the reception coil 210 under the control of the receiving controller. At this time, the wireless power receiving signal is transmitted to the transmitting device 100 in the PWM manner.

Hereinafter, a method for controlling transmission of a wireless power in the wireless power transmitting device having the aforementioned configuration will be described in detail with reference to FIG. 2.

Figure 2:
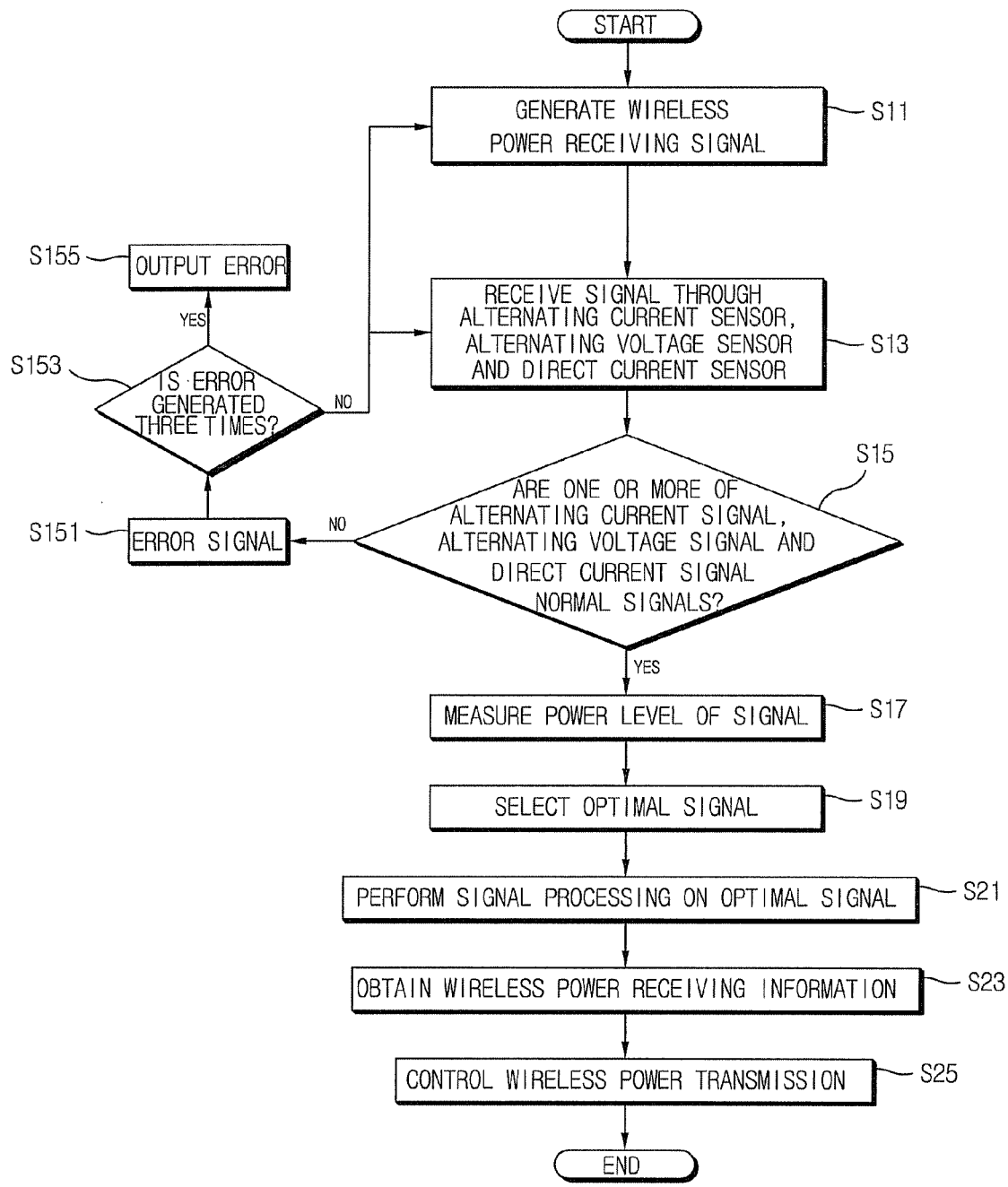
FIG. 2 is a flowchart for describing a method for controlling transmission of a wireless power in the wireless power transmitting device according to the embodiment of the present invention.

FIG. 2 is a flowchart for describing a method for controlling transmission of a wireless power in the wireless power transmitting device according to the embodiment of the present invention. As shown in the drawing, the wireless power transmitting device receives the wireless power receiving signal generated from the wireless power receiving device through the transmission coil. That is, the wireless power transmitting device measures the change of the current and voltage of the coil or the current of the driving driver that is changed by the wireless power receiving signal transmitted from the reception coil of the wireless power receiving device to receive the signal (S11 and S13). That is, the wireless power transmitting device receives the wireless power signal through the alternating current sensor and the alternating voltage sensor connected to the transmission coil and the direct current sensor connected to the driving driver.

Subsequently, the transmitting controller analyzes the alternating current signal from the alternating current sensor, the alternating voltage signal from the alternating voltage sensor, and the direct current signal from the direct current sensor to check whether or not a normal signal exists (S15). When all of three signals are in an error state, an error signal is generated, so that the transmitting controller is returned to the operation S13 (S151). When the error states of the three signals occur more than a predetermined number of times (three times in the embodiment) (S153), the error signal is output through the indicator (S155). When the error signal is generated, the transmitting controller may control the indicator to inform user of the charging being currently impossible.

Meanwhile, when any one or more of the alternating current signal, the alternating voltage signal and the direct current signal are normal signals, power levels of the signals are measured (S17). At this time, when the number of the normal signals is one, the wireless power receiving signal (the wireless power receiving information) is obtained from the signal, so that the wireless power transmission is controlled. Meanwhile, when the number of the normal signals is two or more, power levels of the signals are measured, and an optimal signal (that is, a signal having the highest power level) is selected (S19). Thereafter, signal processing (analyzing) is performed on the optimal signal to obtain the wireless power receiving signal (the wireless power transmitting information), so that the wireless power transmission is controlled (S21, S22 and S25). For example, when the wireless power information is a voltage-up signal, the frequency is controlled or the power level of the wireless power signal is increased, so that it is possible to control such that the wireless power signal having a higher voltage is transmitted.

Hereinafter, the present invention will be described in more detail in connection with a practical example of the wireless power receiving signal processing according to the aforementioned method with reference to FIG. 3.

Figure 3:
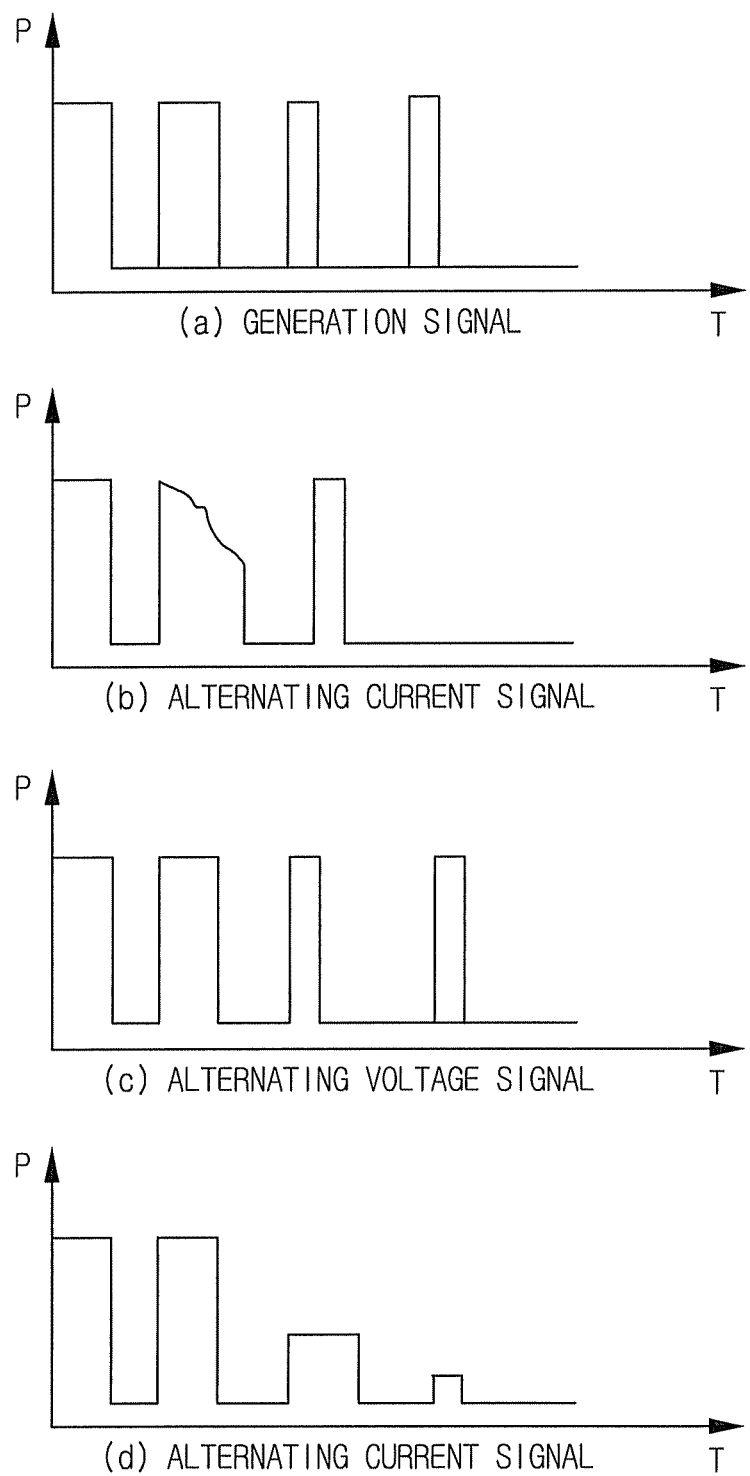
FIG. 3 shows graphs for describing aspects of signal reception of a wireless power receiving signal according to the embodiment of the present invention.

FIG. 3 shows graphs for describing aspects of the signal reception of the wireless power receiving signal according to the embodiment of the present invention. The first graph (a) represents a wireless power receiving signal generated by the wireless power receiving device. In this way, when the wireless power receiving signal is transmitted from the wireless receiving device, the alternating current signal, the alternating voltage signal, and the direct current signal are generated as in the second graph (b), the third graph (c), and the fourth graph (d). It can be seen from the alternating current signal in the second graph that the second signal of an unstable power level is received, and the fourth signal is not received. Accordingly, it can be seen that the wireless power receiving signal is normally received by the alternating current sensor.

As represented in the third graph, it can be seen that the wireless power receiving signal is normally received from the alternating voltage sensor.

As represented in the fourth graph, in the direct current sensor, a signal delay is shown from the third signal, power levels of the third and fourth signals are lower than a normal level, but the wireless power receiving signal can be analyzed.

In this case, as shown in FIG. 2, a signal level of the direct current sensor is low, and the wireless power receiving signal of the alternating voltage sensor is analyzed to be processed, so that it is possible to increase a reception rate and reliability of the wireless power receiving signal.

According to the embodiment of the present invention having the above-described configuration, since the wireless power receiving information is obtained by receiving the wireless power receiving signals obtained through at least two sensors and processing the received wireless power receiving signals, it is possible to increase reliability of the power control in the wireless power transmission.

Moreover, since the reception error is generated only when all signals obtained from at least two sensors are in an error state, a reception error rate of the wireless power receiving signal is reduced, so that it is possible to guarantee continuity of the power control.

The wireless power transmitting device and the method for controlling transmission of a wireless power signal in the wireless power transmitting device described above may be limited to the configurations and methods of the above-described embodiments, but may be implemented by selectively combining all or some of the embodiments to allow the embodiments to be modified in various manners.

The invention claimed is:

1. A method for controlling to transmit a wireless power signal in a wireless power transmitting device, the method comprising:
   receiving a wireless power receiving signal from a wireless power receiving device through a transmission coil;
   receiving the wireless power receiving signal by receiving at least two of an alternating current signal and an alternating voltage signal of the transmission coil which is generated by the wireless power receiving signal and a direct current signal of a driving driver;
   performing signal processing on normal signals to obtain wireless power receiving information included in the wireless power receiving signal when one or more of the received signals are the normal signals; and
   controlling a wireless power signal on the basis of the wireless power receiving information.

2. The method of claim 1, further comprising:
determining that the wireless power receiving signal is a reception state error when the signal processing is not normally performed on all of the alternating signal, the direct current signal and the alternating voltage signal.

3. The method of claim 1, wherein the step of receiving the wireless power receiving signal by receiving at least two of an alternating current signal and an alternating voltage signal of the transmission coil which is generated by the wireless power receiving signal and a direct current signal of a driving driver includes obtaining the wireless power receiving signal by sequentially operating an alternating current sensor and the alternating voltage sensor connected to the transmission coil and the direct current sensor connected to the driving driver.

4. The method of claim 1, wherein the step of performing signal processing on normal signals to obtain wireless power receiving information included in the wireless power receiving signal when one or more of the received signals are the normal signals includes selecting a signal having the highest power level among the alternating current signal, the alternating voltage signal and the direct voltage signal, as the optimal signal, to perform the signal processing on the optimal signal.

5. The method of claim 1, wherein the wireless power receiving signal includes an ID signal, a voltage-up signal, a voltage-down signal, and a full charging signal.

* * * * *